April 9, 1957  C. M. PAYNE  2,788,415
LOW ENERGY THERMOSTAT
Filed March 5, 1956

INVENTOR.
Clifford M. Payne
BY
AGENT

United States Patent Office 2,788,415
Patented Apr. 9, 1957

2,788,415
LOW ENERGY THERMOSTAT

Clifford M. Payne, Portland, Oreg., assignor to Iron Fireman Manufacturing Company, Portland, Oreg.

Application March 5, 1956, Serial No. 569,652

2 Claims. (Cl. 200—122)

This invention relates generally to space thermostats and more particularly to a space thermostat adapted to switch the control circuit of a space heating burner using the Seebeck effect of a pilot burner applied to a couple of diverse metals to generate the control current.

It is well known that a great many gas fired space heaters use safety pilot equipment and that many of these equipments use the small current induced in a circuit including a thermocouple near the pilot burner and a solenoid to maintain a safety gas valve in its burner operative position while the pilot burner is generating heat.

Also it is common in gas burning systems to provide in the control circuit adjacent the pilot burner a number of thermocouples in series to generate current enough to energize the operating solenoid of a specially designed main gas valve. A space thermostat in series with the thermocouples and the solenoid operator of the main gas valve is used to control the heat supply.

It also is common in burner control circuits of a more usual type to use a space thermostat in a 12 volt or 24 volt control circuit receiving energy from an outside source. Such circuits are standard with automatic coal burners and automatic oil burners and have the advantages of a sufficiently large control circuit voltage and current so that a thermostat heater in the control circuit may be used to heat the thermostat during the operation of the burner and therefor cause the thermostat to open to shut off the burner before the space is up to the temperature for which the thermostat is set. The resistance and position of the thermostat heater in the thermostat is selected to shut off the burner in anticipation of sufficiently heating the space after the burner shuts down with the heat stored in the heating plant while the burner was in operation.

This type of operation with an anticipating heater in the thermostat is most desirable with the heavier equipment and greater heat storage of coal or oil burning systems but good gas burning equipment also has sufficient heat storage to make the anticipating type of thermostat desirable. Thus where an outside source of electricity is available many gas burning systems have used the 12 or 24 volt control circuits in order to use the anticipating thermostat.

It is the primary object of this invention to provide an anticipating type space thermostat adapted to be effectively used in the low energy control circuit of a space heating burner using the energy generated in a series of thermocouples to energize the circuit.

How this and other objects are attained is explained in the following description referring to the attached drawing in which Fig. 1 is a plan view (with cover removed) of a space thermostat showing one form in which the present invention is practiced.

Like numerals of reference refer to like parts in the several figures of the drawing.

Figure 1:
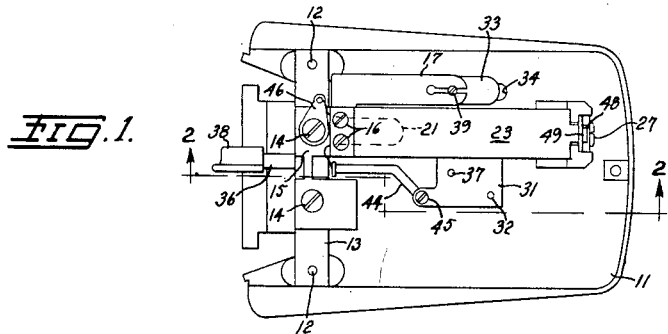
Figure 2:
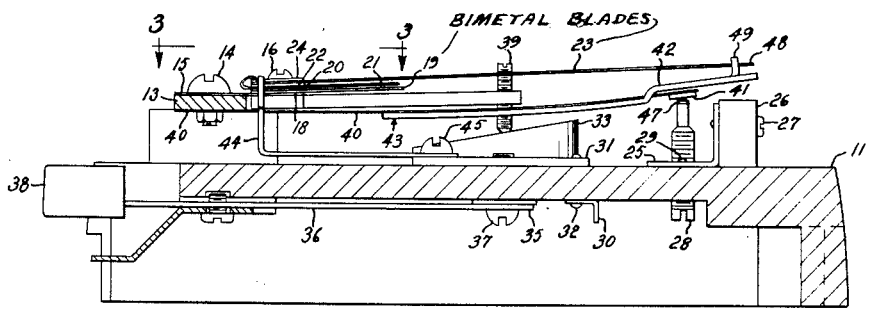
Fig. 2 is an enlarged sectional view along the line 2—2 of Fig. 1.
Figure 3:
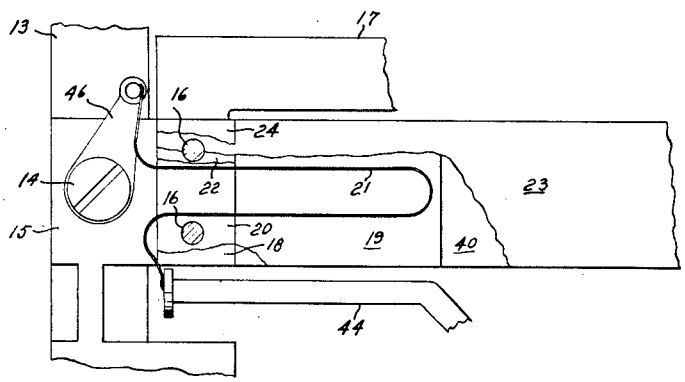
Fig. 3 is an enlarged fragmental plan view as seen from the line 3—3 of Fig. 2 with parts cut away to show the essential elements of this invention.

It is understood that in the type of anticipating thermostat used with the 12 or 24 volt control system energized from an outside source the control circuit current may be of the order of a half an ampere and the heating resistor may be of the order of one ohm thus supplying heat at a rate of one fourth watt. With this heating power available a sufficient heat anticipation of as much as 3 degrees of the thermostat setting is available with the heater located in the thermostat case not in contact with but only in the vicinity of the temperature sensitive element.

But the available current in the control circuit with which the present thermostat is adapted to be used will be only of the order of one thirteenth ampere which with a one ohm heater will supply heat at a rate of approximately one one-hundred-sixtieth of a watt or only at a rate of one fortieth of the heat supplied to the thermostat by the 12 or 24 volt control circuit. The heat can not be wasted. All of it must be applied as directly as possible to the job of modifying the normal thermostat reading.

Referring now to the drawing there is shown the essential working parts of a common type of space temperature controlling thermostat modified in accordance with the teaching of this invention.

On a rigid insulating base 11 is secured by screws 12 a metal strap 13 on which is secured by bolt 14 a spring metal hinge strip 15.

Stacked on the free end of hinge strip 15 and secured thereto by screws 16 are L-shaped thermostat setting lever 17, paper spacer 18, bimetal auxiliary blade 19, insulating spacer 20, hairpin heater wire 21, insulating spacer 22, main bimetal blade 23 and insulating spacer 24.

Terminal bracket 25 to which permanent magnet 26 is secured by screw 27 and into which stationary contact adjusting post 28 is threaded is secured to base 11 by rivets 29. Terminal bracket 30 is secured to base 11 and terminal plate 31 by rivets 32.

Adjusting wedge 33 guided in slot 34 engages the short end of bell crank 35 and is movable along slot 34 thereby as the long end 36 of bell crank 35 is rotated about screw 37 on which bell crank 35 is pivoted and which is secured in plate 31. For easy manual adjustment of bell crank 35 its long end is tipped with an enlarged position indicator 38.

Calibrating screw 39 threadedly engaged in lever 17 is biased toward wedge 33 by spring hinge 15.

Secured at one end under fixed strap 13 by bolt 14 is flexible switch blade 40 carrying at its free end moveable contact 41. The contact end of blade 40 is narrowed to pass between the separated ends of magnetic armature 42 secured at 43 to blade 40.

One end of heater wire 21 is secured to conductor 44 connected to plate 31 by screw 45. The other end of heater wire 21 is secured to clip 46 connected to strap 13 and blade 40 by bolt 14.

The electrical path through the thermostat is from bracket 25 through stationary contact adjusting post 28, stationary contact 47, moveable contact 41, blade 40, bolt 14, clip 46, heater 21, conductor 44, screw 45, plate 31 and rivet 32 to bracket 30. Whenever the thermostat contacts are closed one on the other while the thermostat is in use in an energized control circuit it is seen that the control circuit current will pass through heater 21 and supply anticipating heat to the bimetal blades of the thermostat.

From the drawing it is seen that the free end 48 of the main bimetal blade 23 is engaged under cross bar 49 connecting the ends of bifurcated armature 42. Blade 23 bows concavely upward when heat is applied and lifts armature 42 upwardly against the bias of magnet 26, taking with it switch blade 40 against the downward bias of its own resilience. To cause the thermostat contacts to open before the desired temperature of the ambient air is reached or in anticipation of a sufficient supply of heat heater 21 is inserted in the control circuit and positioned to add heat to blade 40.

Since the heat energy available from heater 21 is extremely low it must not be wasted and all possible of it must be transferred to blade 40. To accomplish this in the form in which the invention is here shown to be practiced it should be noted that heater 21 is a short hairpin of fine Nichrome wire covered with a thin layer of plastic insulation. Heater 21 at its terminal end is spaced from main bimetal blade 23 by a thin insulation strip 22 and from auxiliary bimetal blade 19 by a thin insulation strip 20. The insulation applied directly to the wire is the only solid separation material between the loop end of heater 21 and bimetal blades 19 and 23. On an increase of temperature auxiliary bimetal blade 19 bows concavely upward as does bimetal 23 and therefore the relative positions of heater 21 and bimetal blades 19 and 23 are maintained over the operating temperature range of the thermostat.

The drawing shows sufficient separation of heater 21 from blades 19 and 23 to indicate their individual existence while in reality the loop end of heater 21 will be closely held between blades 19 and 23 so that substantially all heat generated in heater 21 is immediately given up to blades 19 and 23.

Having thus recited a principal object of my invention, illustrated and described a form in which the invention is successfully practiced and explained its operation, I claim:

1. A heat anticipating space thermostat for use in a low energy control circuit of a means for supplying heat to a space, said thermostat comprising a pair of electric circuit terminals, a movable switch contact, a stationary switch contact, biasing means for biasing said movable contact toward said stationary contact, a first bimetal blade for opposing said biasing means in response to the temperature of said blade, a second bimetal blade positioned to bow in the same direction as said first bimetal blade on an increase in the temperature of both said blades, an electric heater connected in series with said contacts between said pair of terminals, said bimetal blades being exposed to the air in said space to open said movable contact from said stationary contact at a preset temperature in said space and means for securing said heater insulatedly sandwiched between said bimetal blades to cause said first bimetal blade to separate said contacts at a temperature in said space lower than said preset temperature when electric current is flowing through said heater.

2. The thermostat of claim 1 in which said second bimetal blade has substantially the same area exposed to said heater as does said first bimetal blade and less heat radiation area than said first bimetal blade whereby the temperature of said second bimetal blade will be somewhat greater than the temperature of said first bimetal blade and said second bimetal blade will tend to press said heater against said first bimetal blade when control current is passing through said heater.

References Cited in the file of this patent
UNITED STATES PATENTS

| | | |
|---|---|---|
| 2,409,420 | Clark | Oct. 15, 1946 |
| 2,590,041 | Roost | Mar. 18, 1952 |
| 2,623,137 | Vogelsberg | Dec. 23, 1952 |
| 2,740,862 | Allen | Apr. 3, 1956 |